(12) United States Patent
Harris et al.

(10) Patent No.: US 7,099,891 B2
(45) Date of Patent: Aug. 29, 2006

(54) METHOD FOR ALLOWING SIMPLE INTEROPERATION BETWEEN BACKEND DATABASE SYSTEMS

(75) Inventors: Clifford Vernon Harris, Hurley, NY (US); Jeffrey Thomas Kreulen, San Jose, CA (US); Vikas Krishna, San Jose, CA (US); Kevin Snow McCurley, San Jose, CA (US); Sami Nicole Rollins, Arroyo Grande, CA (US); Hovey Raymond Strong, Jr., San Jose, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 09/882,634

(22) Filed: Jun. 15, 2001

(65) Prior Publication Data

US 2002/0194357 A1 Dec. 19, 2002

(51) Int. Cl.
*G06F 17/00* (2006.01)
*G06F 7/00* (2006.01)
(52) U.S. Cl. .................... 707/104.1; 707/101
(58) Field of Classification Search ............ 707/1–203
See application file for complete search history.

(56) References Cited

U.S. PATENT DOCUMENTS

| | | | | |
|---|---|---|---|---|
| 5,860,070 A | * | 1/1999 | Tow et al. | 707/8 |
| 5,893,127 A | * | 4/1999 | Tyan et al. | 715/513 |
| 6,336,137 B1 | * | 1/2002 | Lee et al. | 709/219 |
| 6,363,411 B1 | * | 3/2002 | Dugan et al. | 709/202 |
| 6,581,062 B1 | * | 6/2003 | Draper et al. | 707/100 |
| 6,591,272 B1 | * | 7/2003 | Williams | 707/102 |
| 2001/0034733 A1 | * | 10/2001 | Prompt et al. | 707/102 |
| 2002/0108121 A1 | * | 8/2002 | Alao et al. | 725/110 |
| 2002/0135794 A1 | * | 9/2002 | Rodriguez et al. | 358/1.15 |
| 2004/0015840 A1 | * | 1/2004 | Walker | 717/108 |
| 2004/0172278 A1 | * | 9/2004 | Bell | 705/1 |
| 2005/0015732 A1 | * | 1/2005 | Vedula et al. | 715/805 |

OTHER PUBLICATIONS

Dan, A. and Parr, F. "The Coyote Approach for Network Centric Service Applications: Conversational Service Transactions, a Monitor and an Application Style," presented at the High Performance Transaction Processing (HPTS) Workshop, Asilomar, CA, 1997, pp. 1-26.

* cited by examiner

*Primary Examiner*—Don Wong
*Assistant Examiner*—Linh Black
(74) *Attorney, Agent, or Firm*—Jose Gutman; Fleit, Kain, Gibbons, Gutman, Bongini & Bianco P.L.

(57) ABSTRACT

According to a preferred embodiment of the present invention, a bridging system (100) and method provides a way of linking two independent data systems by receiving a dataset from a source data system. The bridging system (100) translates the dataset from a source schema to a target schema according to a set of mapping rules, and queues the translated data in persistent storage, and then sends the translated dataset to a destination data system. The system (100) includes an XML bridge (114), multiple application specific gateways (116,118), and a web admin interface (210), all in communication via a wide area network.

12 Claims, 7 Drawing Sheets

116, 118

METHOD FOR ALLOWING SIMPLE INTEROPERATION BETWEEN BACKEND DATABASE SYSTEMS

BACKGROUND OF THE INVENTION

1. Field of the Invention

This invention generally relates to the field of computer database systems, and more particularly relates to a system and method for translating and communicating between database systems.

2. Description of Related Art

The explosive growth of the World-Wide-Web, eCommerce, and networks (extranets) between enterprises has led to an increased demand and opportunity for connecting the backend databases of some enterprises to exchange information amongst themselves. A typical example includes a particular enterprise using the services of two other solutions and service-oriented organizations. The servicing organizations might need to have some of their networks and databases shared between them or alternatively bridged to be able to provide a good level of service to the serviced enterprise in some common area, for example IT related problem management. One of the servicing organizations might need to let the other servicing organization know the status of a particular problem that the serviced enterprise may have. Or one of the servicing organizations may want to update the other on some work that it may have performed and may be of interest to the other organization about a problem that the two might be involved with. If the servicing organizations would rather not give each other direct access to their resources then such situations give rise to the need for effectively bridging the resources, like backend request or problem management systems.

Other problem management systems have been bridged in the past using architecture schemes with a low level of versatility. Whenever a change occurs on one side of the system, the need to update underlying code propagates throughout the entire system. This adds expense and downtime to the system. Also, the entire system must be functional in order for the system to operate. If one side goes down, the whole system is inoperable, as both sides must be running in order to facilitate a smooth, uninterrupted transfer. This could possibly create stress on the relationship between organizations.

Therefore a need exists to overcome the problems with the prior art as discussed above, and particularly for a bridging system to provide continuous operation between the end database systems with versatility to be able to handle different real life situations.

SUMMARY OF THE INVENTION

According to a preferred embodiment of the present invention, a bridging system and method provides a way of linking two independent data systems by receiving a dataset from a source data system; translating the dataset from source schema to target schema according to a set of mapping rules; queuing the translated data in persistent storage; and sending the translated dataset to a destination data system. The system preferably includes an XML bridge, multiple application specific gateways, and a web admin interface; all preferably coupled via a wide area network interface.

DESCRIPTION OF THE PREFERRED EMBODIMENTS

The present invention, according to a preferred embodiment, overcomes problems with the prior art by implementing a database independent Bridge responsible for managing ticket queues containing problem tickets, for example, being shipped from one problem management system to another via a pair of database specific Gateways. It also uses XML as the language in which data is passed from one component to another making it easy to plug different problem management systems by simply plugging in their data dictionary in the form of a document type definition (DTD).

A preferred embodiment achieves this level of autonomous interoperation using common web standards such as HTTP, XML, HTML, and relational query language SQL.

Figure 1:
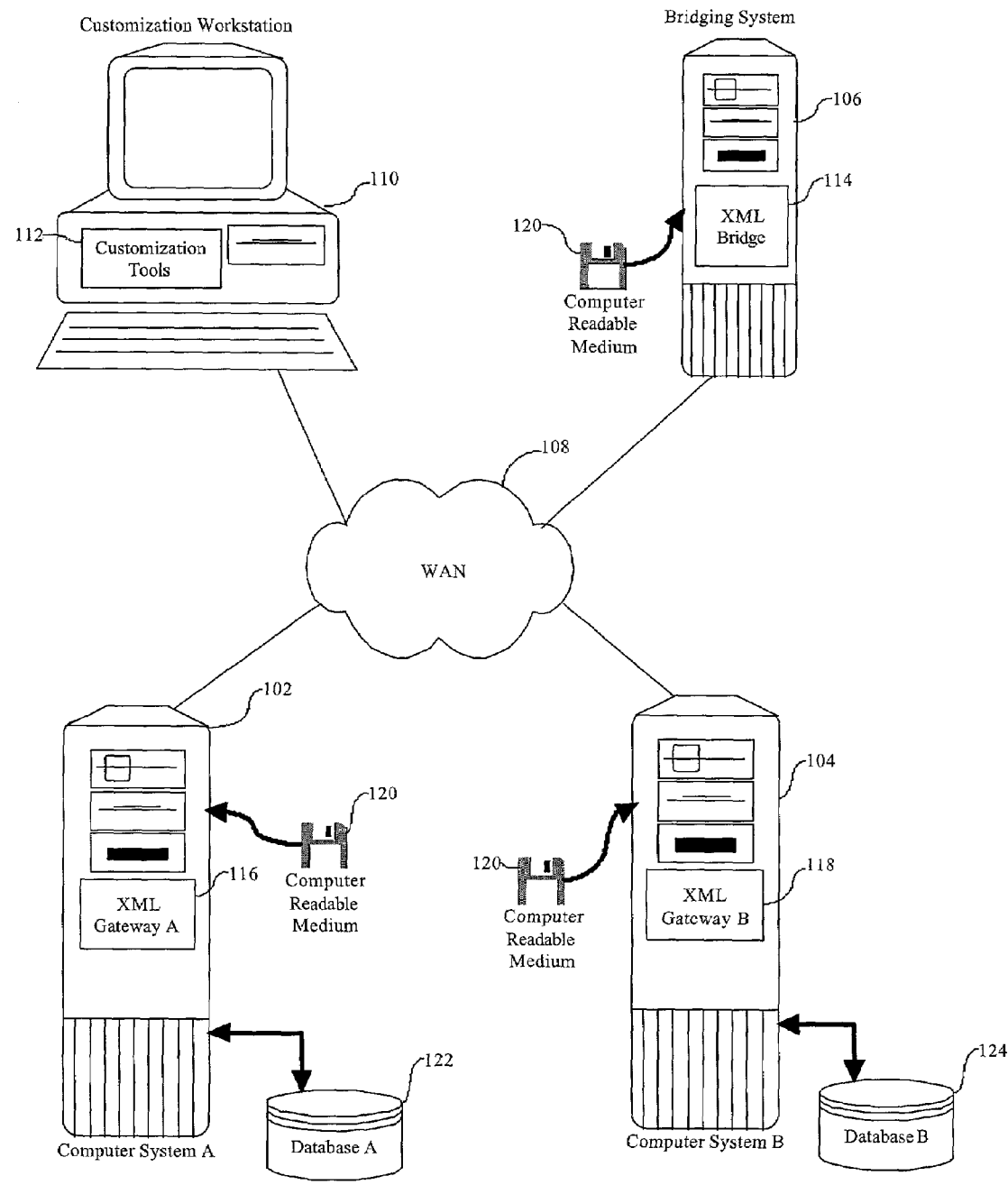
FIG. 1 is a block diagram illustrating a bridging system in accordance with a preferred embodiment of the present invention.
Figure 2:
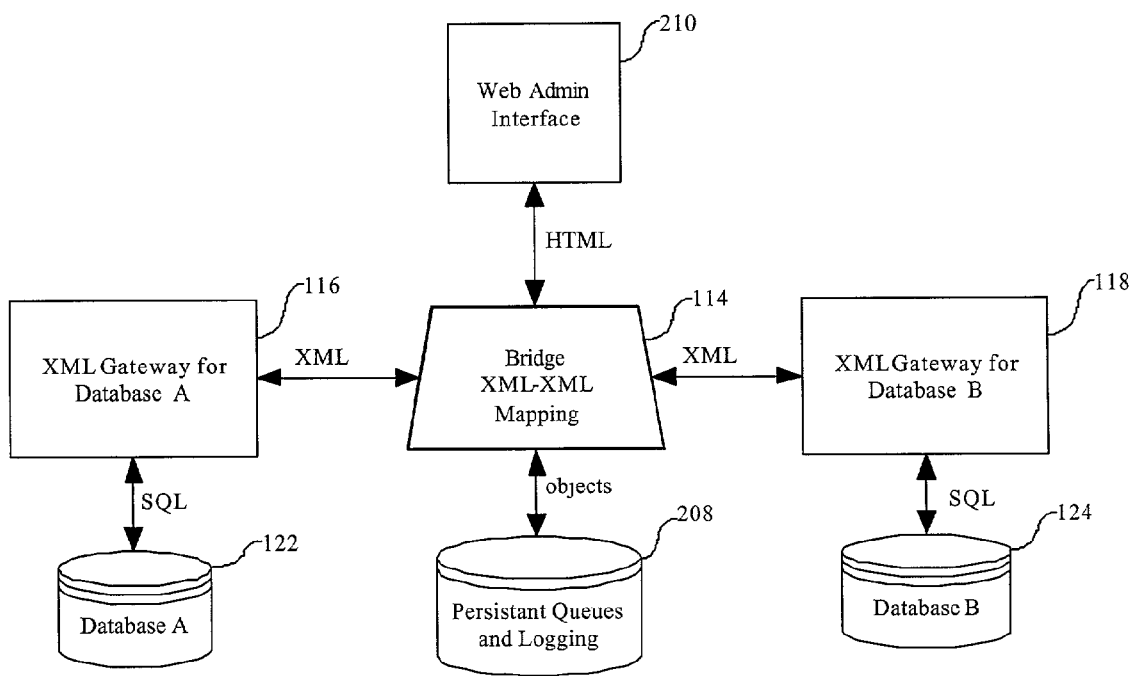
FIG. 2 is a more detailed block diagram showing interoperating components in the system of FIG. 1, according to a preferred embodiment of the present invention.

FIGS. 1 and 2 illustrate an exemplary bridging system according to a preferred embodiment of the present invention. The bridging system 100 includes a computer system A 102, having an XML gateway 116 and communicatively coupled to a database system A 122. The computer system A 102 may be communicatively coupled, via a network 108, to a computer system B 104, a bridging system 106, and a customization workstation 110. The network 108 may comprise any combination one of a local area network, a wide area network, at least one wired communication link, at least one wireless communication link, or any combination of the aforementioned listed items.

The computer system B 104 comprises an XML gateway 118 and is communicatively coupled to a database system B 124. The database system B 124 may be communicatively coupled to the computer system B 104 via a local area network interface (not shown). Likewise, database system B 124 could also be remotely located. The computer system A 102 and the database system A 122 could similarly be coupled via a local area network interface (not shown) or could also be located remotely. Additionally, each database system 122, 124, as used herein is only for illustration purposes. Generally, an application, or any other data source or data target, can be communicatively coupled to the respective gateways 116, 118, to send and/or receive data elements in accordance with the present invention. Also, datasets can be delivered to/from the data source and the data target, such as an application or a database system, or generally a source data system and a destination data system. These datasets comprise data stored according to a data schema form for the respective data source and/or data target or destination. The translation of datasets to properly represent the data schema being converted from a data source system to a data target system is a key feature of the present invention, as will be discussed in more detail below. One of the strengths of the present system is the ability to translate source datasets, i.e., datasets in a source system data schema, to intermediate neutral datasets, i.e., datasets in an intermediate "neutral" data schema, and then the system 100 translates intermediate neutral datasets to target datasets, i.e., datasets in a target system data schema.

The bridging system 106 contains an XML bridge 114 and a persistent memory device 208 such as a hard drive or other non-volatile memory. The customization workstation 110 contains customization tools 112 for easy upgrades. For example, a programming language such as JAVA can be used by a system developer to customize and develop system data translation functional components and translation mapping rules for use in the system 200 as will be discussed below.

Each computer system may include, inter alia, one or more computers and at least a computer readable medium 120, an example being shown in FIG. 1. The computer readable medium 120 allows a computer system to read data, instructions, messages or message packets, and other computer readable information from the computer readable medium 120. The computer readable medium may include non-volatile memory, such as Floppy, ROM, Flash memory, Disk drive memory, CD-ROM, and other permanent storage. It is useful, for example, for transporting information, such as data and computer instructions, between computer systems.

According to one exemplary embodiment, as illustrated by the system architecture 200, the system is split into a central XML bridge component 114, multiple application specific XML gateways (adapters) 116,118 and a Web-based Administrative Interface 210 to the system as shown in FIG. 2 (with two gateways).

Figure 3:
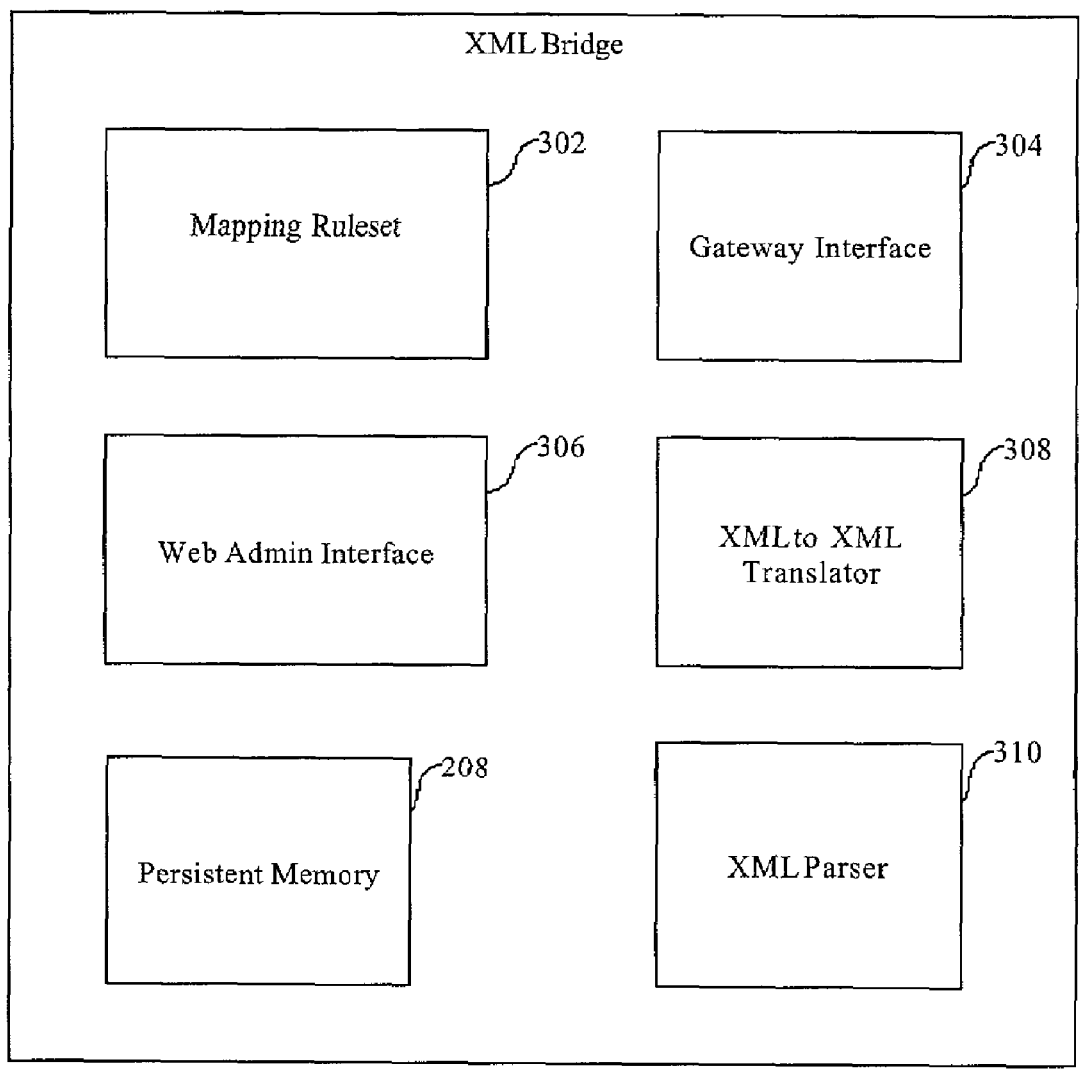
FIG. 3 is a more detailed block diagram showing an exemplary XML bridge in the system of FIG. 1, according to a preferred embodiment of the present invention.

The Bridge component 114, shown in more detail in FIG. 3, contains a mapping ruleset 302; a web admin interface 306, communicatively coupled to the mapping ruleset 302 and to customization tools 112 located at a customization workstation 110; a gateway interface 304 communicatively coupled to each gateway 116,118 in the system; an XML parser 310, communicatively coupled to the mapping ruleset; an XML to XML translator 308, communicatively coupled to the mapping ruleset 302, the XML parser 310, and the gateway interface 304; and persistent memory 208 communicatively coupled to the XML to XML translator 308 and the gateway interface 304. According to the present example, a neutral dataset comprises an XML document. Additionally, according to an alternative preferred embodiment of the present invention, the web administrative interface 306 is communicatively accessible by means of a browser.

Figure 4:
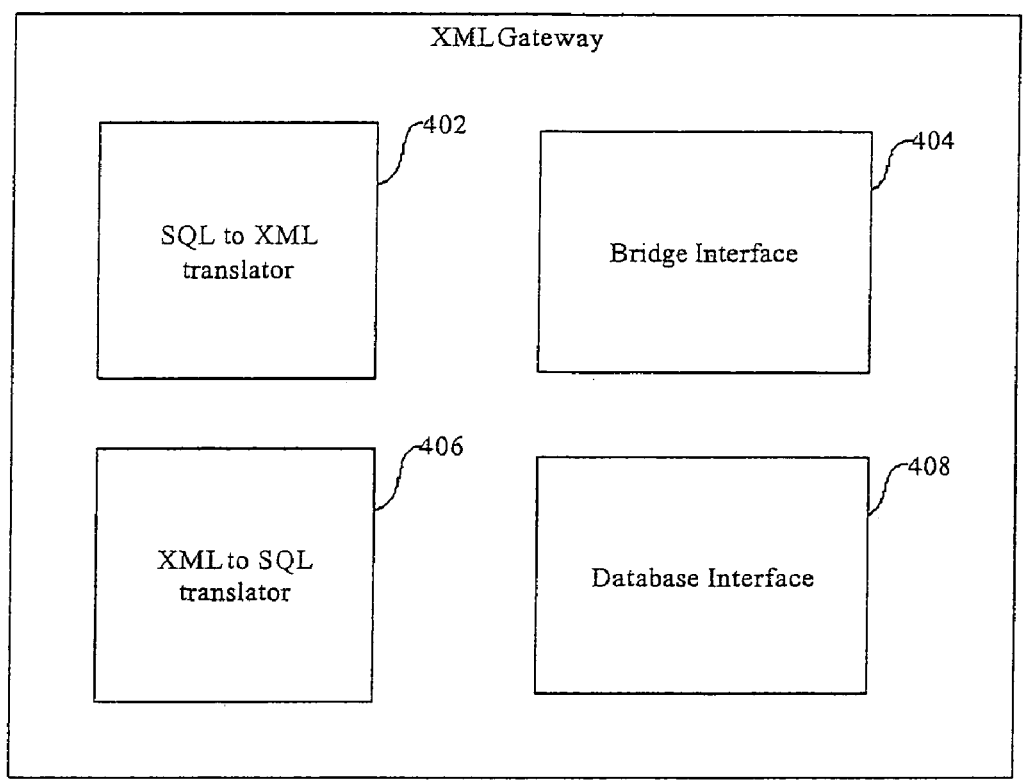
FIG. 4 is a more detailed block diagram showing an exemplary XML gateway in the system of FIG. 1, according to a preferred embodiment of the present invention.

FIG. 4 illustrates the exemplary XML gateway 116, 118 according to a preferred embodiment of the present invention. The gateway 116, 118 acts as an adapter to the database 122, 124 with which it is associated. The gateway 116, 118 is written specifically for the database 122, 124 to which it connects and serves. The gateway 116, 118 in this example, is communicatively coupled to a database 122, 124, respectively, via a database interface 408. The SQL to XML translator 402 translates SQL results, such as problem ticket data stored in database A 122 into XML documents. The SQL to XML translator 402 is communicatively coupled to the database interface 408 and a bridge interface 404. The bridge interface 404 is communicatively coupled to the XML bridge 114. The XML to SQL translator 406 converts XML documents received from the bridge 114 into a set of SQL transactions to be carried out against the associated database 122, 124. The XML to SQL translator 406 is also communicatively coupled to the database interface 408 the bridge interface 404.

Figure 5:
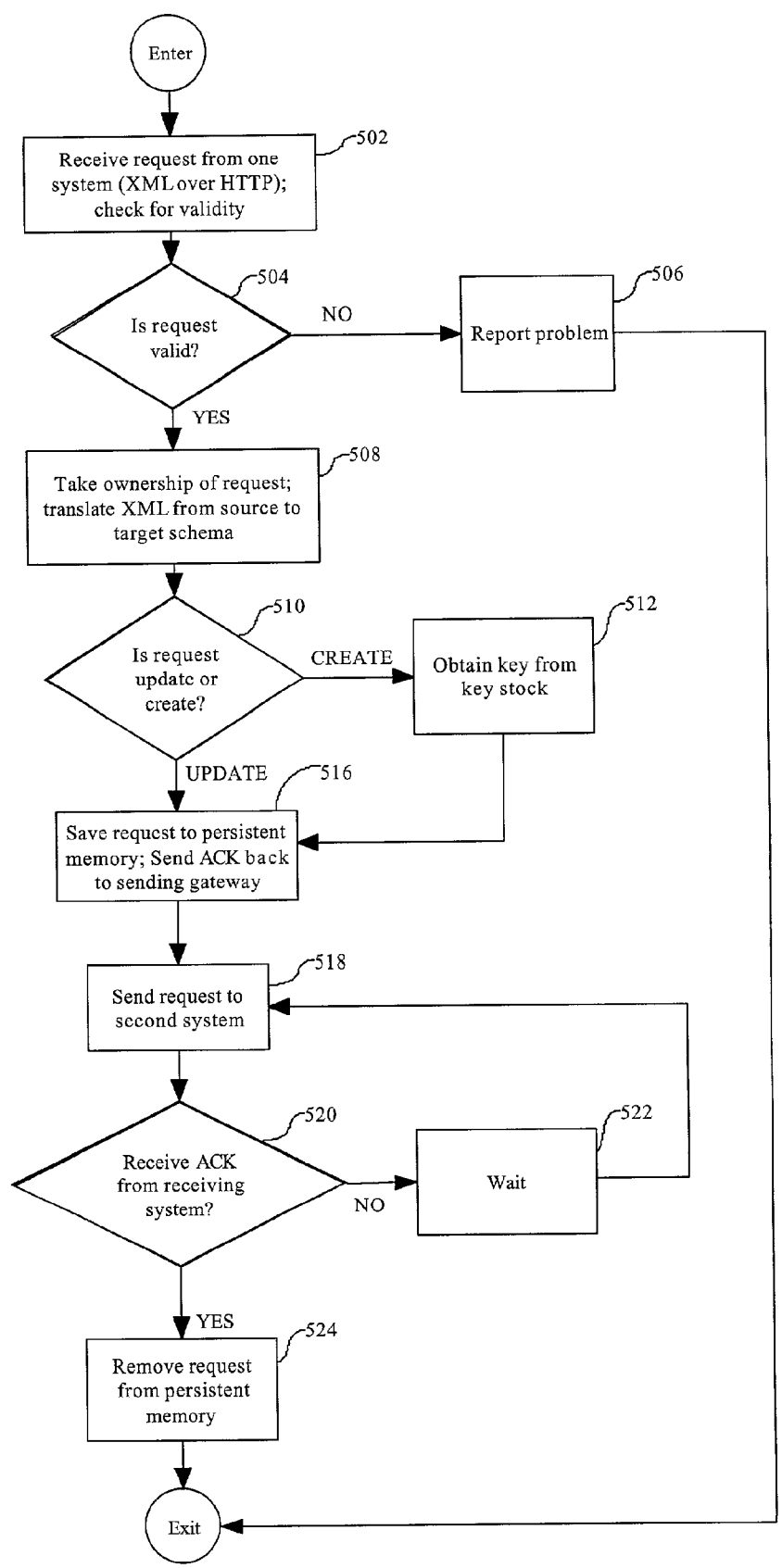
FIGS. 5, 6, and 7, are three operational flow diagrams illustrating three exemplary operational sequences for the system of FIG. 1, according to preferred embodiments of the present invention.
Figure 6:
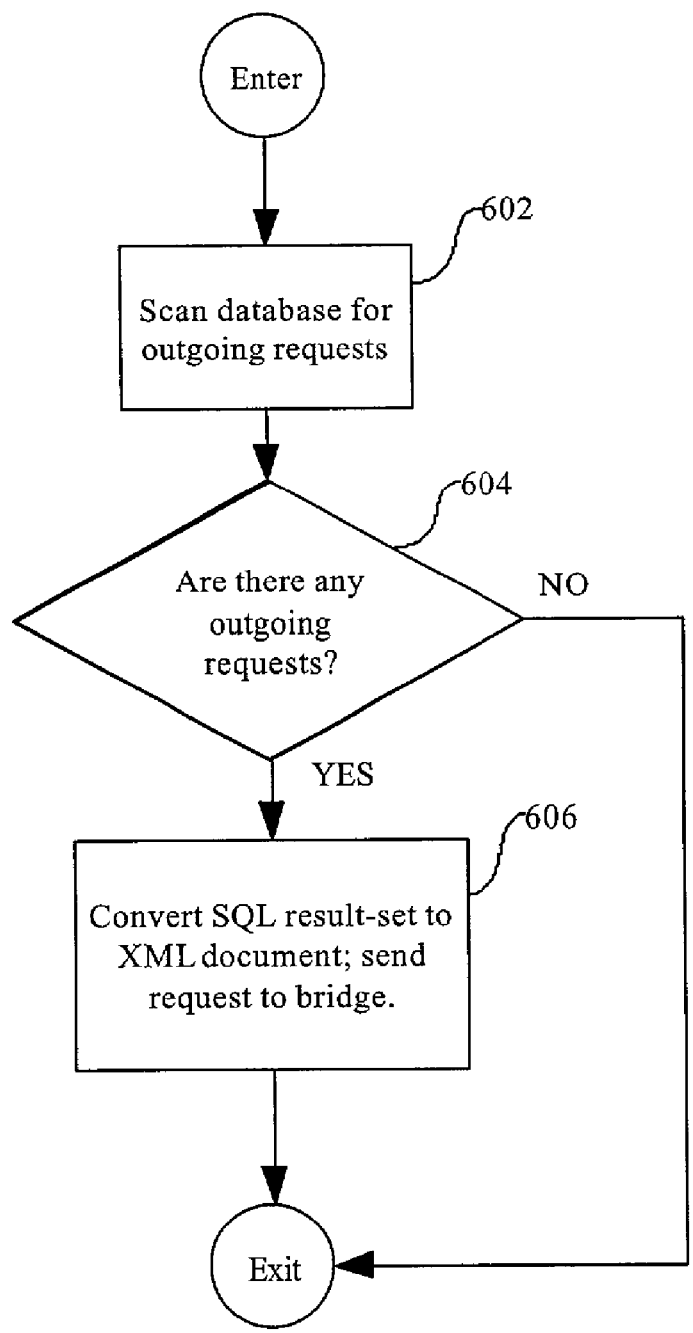
Figure 7:
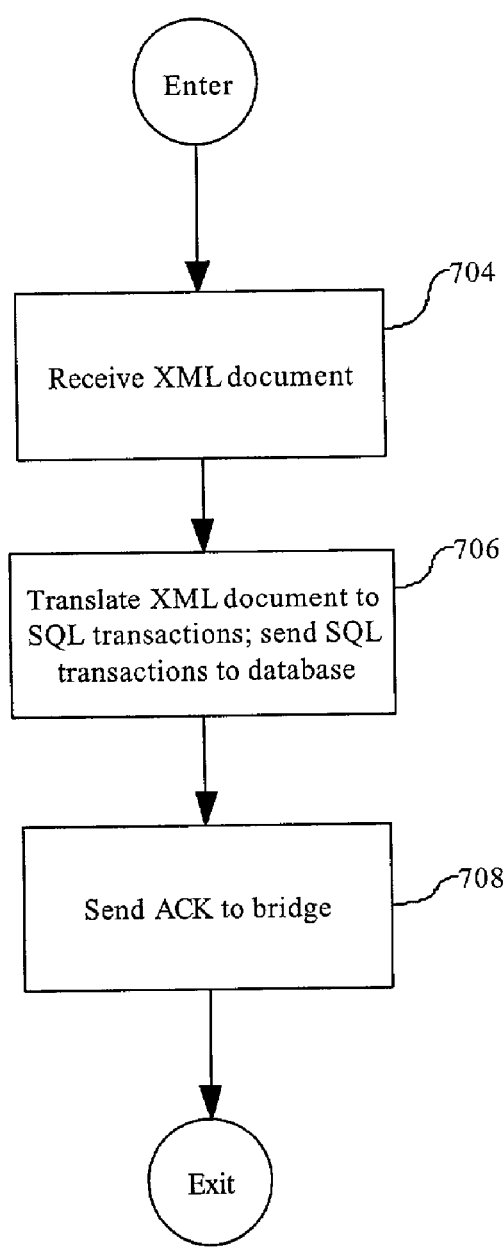

FIGS. 5, 6 and 7 are operational flow diagrams illustrating exemplary operational sequences for the system of FIG. 1. The XML bridge 114, at step 502, receives requests from one system through the Gateway associated with that database system, in the form of XML over HTTP. For this example, the sending system is computer system A 106 and the receiving system is computer system B 104. The incoming XML is checked for validity using the XML parser 310 and the DTD corresponding to the schema of the sending database. If for some reason the translation of an XML document fails, then the Bridge 114, at step 506, reports the problem to a human as an alert to have the problem fixed. The XML to XML translator 308 then translates the XML document, containing a problem ticket for example, to the XML document corresponding to the DTD and schema of the destination database system 124. This is done using a set of mapping rules 302 that specify the conversion business logic between the two similar or very different systems.

According to a preferred embodiment of the present invention, each mapping rule comprises a type and instructions for obtaining one or more target data element values as a function of one or more source data element values. The type contains all the information about relationships among data elements used by the function. According to an alternative preferred embodiment, there are a finite number of prespecified rule types that are defined generally for XML documents. A first type restricts the function to one target data element that is restricted from repeating in the target dataset by the relationships of the target schema and to any number of source data elements that are restricted from repeating in the source dataset by the relationships of the source schema. A second type restricts the function to one instance of a group comprising multiple data elements that are restricted from repeating as a group by the relationships of the target schema and to any number of source data elements that are restricted from repeating in the source dataset by the relationships of the source schema. A third type restricts the function to a first number of instances of a group comprising multiple data elements that are restricted from repeating as a group by the relationships of the target schema, a second number of instances of a group comprising multiple data elements that are restricted from repeating as a group by the relationships of the source schema, and any number of source data elements that are restricted from repeating in the source dataset by the relationships of the source schema, the first and second numbers being equal.

If the incoming XML document is found to be valid and successfully translated, the Bridge 114 takes ownership of the request, at step 508, and allows the sending Gateway 116 to assume that the request has been sent out. This way, the Bridge 114 acts as a buffer between the two backend systems 104,106 allowing any one of them to continue operation, sending requests to the other system, while the other one may even be down for some reason. This feature reduces the losses by reducing the effective down time.

Each of the distributed parts of a bridged object is identified (within its application) by a unique key. The entire bridged object is identified by a pair of such keys. A create is a request for creation of a new local part of a bridged object at the destination application corresponding to a part at the sending application. An update is a request to update an existing part of a bridged object at the destination application, corresponding to changes to a part at the sending application. If the incoming request is a create, the bridge 114, at step 512, assigns each create a new key from the receiving application. This key is either obtained directly from the destination application or it is taken from a key stock already cached by the bridge 114, by making a prior request to the receiving application, to increase performance. In case there is a key stock, the bridge reserves a set of consecutive keys from the destination application. It uses this reserved stock to give out new keys to new incoming create requests. When the stock falls below a threshold, the bridge requests a next set of keys. This increases the throughput of the system as the bridge 114 allows one application to send creates and updates independent of the status and speed of the receiving application.

The bridge 114 saves the translated request into a logging database in persistent memory 208 in case the machine running the gateway 118 itself experiences problems or some down time. In that case, the pending requests are picked up from the storage on resumption and sent ahead to the next stage. In the next stage, step 518, the gateway interface 304 sends the translated document to the destination database's gateway 118 to be converted into a set of SQL transactions against that database 124. The bridge interface 404 receives an acknowledgement (ACK) back from the receiving gateway 118 to indicate a successful transaction. If for some reason an ACK is not received, the bridge 114 waits a set period of time and retries. The number of retries is limited to a specific threshold, after which an error is recorded and human intervention is required.

Once these transactions are successfully carried out, the Bridge 114 clears the request from the persistent storage 208 as it has been successfully processed. The Bridge 114 can forward both new requests as well as updates to a previously sent request.

The gateway 116, 118 acts as an adapter to the database 122, 124, that it is associated with. It is written specifically for the database it connects to and serves. In one thread it acts as an XML document to SQL queries converter. The database interface 408, at step 602, scans the attached database 122 for outbound requests. If there are any requests, the SQL to XML translator 402, in step 606, converts the SQL result-set to an XML document, and the bridge interface 404 sends these requests to the bridge 114 in the form of XML over HTTP.

In the inbound direction, the bridge interface 404, in step 704, receives an XML document from the bridge 114. The XML to SQL translator 406 converts the XML document into a set of SQL transactions to be carried out in the receiving database system 118. The database interface 408 sends the SQL transactions to the receiving database 118. Finally, in step 708, the bridge interface 404 sends an ACK back to the bridge 114 to confirm a successful transmission.

According to a preferred embodiment of the present invention, as an example discussed herein, a gateway 118 receives a neutral dataset from the bridge 114. The gateway 118 then translates the neutral dataset to a first destination dataset according to a destination schema. If the neutral dataset has certain specified data values, the gateway 118 reads from the destination database 124 a second destination dataset. The gateway 118 then modifies the first destination dataset according to information in the second destination dataset. The gateway 118 then transmits the first destination dataset to the destination database 124. The gateway 118 then acknowledges a successful transmission of the destination dataset, such as by sending an ACK to the bridge.

While modifying the first destination dataset, the gateway 118 preferably replaces any null data values in the first destination dataset with corresponding data values from the second destination dataset. This dataset correspondence is preferably prespecified in the system 100. Also, according to a preferred embodiment of the present invention, a neutral dataset can be an XML document and a source dataset can be an SQL result-set.

According to another alternative preferred embodiment of the present invention, a central bridge component 114 transforms XML documents into XML documents and communicates these documents with a plurality of application specific gateway components 116, 118. Each gateway 116, 118, transforms the XML documents to and from documents in application specific formats.

Each gateway 116, 118 according to a preferred embodiment, runs in a stateless fashion without touching a disk, for runtime input or output, to store any of its states by relegating those responsibilities to the bridge 114 as described above. This feature makes the gateway 116, 118 fast in sending out datasets from the associated database 122, 124 and receiving in datasets from the bridge 114 to insert into the associated database 122, 124. A bridge component 114 preferably remembers XML documents that it has transformed by storing them in persistent storage. The gateways 116, 118 keep their work in volatile storage, thereby improving the performance of the gateways 116, 118 relative to the performance of the bridge 114.

A key feature of the overall system, described above, is that any change to any component does not have a ripple effect on the remainder of the system. In real life bridging situations, changes can occur either to the end database schemas or to the database interface. By providing configuration files to address these dynamic aspects of a database system, one has to only change the configuration file according to the database change and not rewrite any part of the gateway program to accommodate the change. Similarly, by providing a separate reloadable set of mapping rulesets, external to the Bridge component, one can easily modify the mapping ruleset using the customization tool and have it reloaded by the Bridge to accommodate any change in the business logic that specifies the conversion rules between the source and the target documents. Such component decoupling and separation between variable parameters of a system and the mostly constant majority of the bridging system code brings about considerable savings in time and money needed to carry out the changes in the actual program code and throughout the system.

Preferably, at least the translating, reading, modifying, and transmitting functions of the gateways 116, 118, are performed according to at least one computer program, operating on the respective gateway 116, 118, that takes as input the dataset to be converted and a preset file derived from a database schema so that when the database schema changes, the computer program can be run on the modified file to accommodate the change.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method comprising the steps of:
    receiving a dataset from a source data system, the dataset including a set of data elements with corresponding data values;
    translating the dataset from a source schema to a target schema according to a set of mapping rules, each schema including a set of data elements and a set of relationships among the data elements, each mapping rule including a type and instructions for obtaining one or more target data element values as a function of one or more source data element values, the type containing all the information about relationships among data elements used by the function;
    queuing the translated dataset in persistent storage; and
    sending the translated dataset from the persistent storage to a destination data system, wherein there are three prespecified types that are defined generally for XML documents:
    a first type restricting the function to one target data element that is restricted from repeating in the target dataset by the relationships of the target schema and to any number of source data elements that are restricted from repeating in the source dataset by the relationships of the source schema;
    a second type restricting the function to one instance of a group comprising multiple data elements that are restricted to repeat as a group by the relationships of the target schema and to any number of source data elements that are restricted from repeating in the source dataset by the relationships of the source schema; and
    a third type restricting the function to a first number of instances of a group comprising multiple data elements that are restricted to repeat as a group by the relationships of the target schema, a second number of instances of a group comprising multiple data elements that are restricted to repeat as a group by the relationships of the source schema, and any number of source data elements that are restricted from repeating in the source dataset by the relationships of the source schema, the first and second numbers being equal.

2. The method of claim 1, wherein the step of queuing comprises the steps of:
    assigning a key to each new request; and
    storing a translated dataset in the persistent memory.

3. The method of claim 1, wherein the instructions of each mapping rule comprise a computer program.

4. The method of claim 3, wherein the computer program comprises a Java program.

5. The method of claim 4, wherein the computer program refers only methods of the Java String class.

6. The method of claim 1, further comprising the steps of:
    waiting a set period of time to receive an ACK from the destination system;
    retrying to send the translated dataset to the destination system a set number of times;
    signaling an error if the ACK is not received; and
    upon receipt of the ACK, removing the translated dataset from the persistent memory.

7. A method comprising the steps of:
    receiving an XML document from a source data system, the XML document including a set of data elements with corresponding data values;
    translating the XML document from a source schema to a target schema according to a set of mapping rules, each schema including a set of data elements and a set of relationships among the data elements, each mapping rule including a type and instructions for obtaining one or more target data element values as a function of one or more source data element values, the type containing all the information about relationships among data elements used by the function;
    queuing the translated XML document in persistent storage; and
    sending the translated XML document from the persistent storage to a destination data system, wherein there are three prespecified types that are defined generally for XML documents:
    a first type restricting the function to one target data element that is restricted from repeating in the target XML document by the relationships of the target schema and to any number of source data elements that are restricted from repeating in the source XML document by the relationships of the source schema,
    a second type restricting the function to one instance of a group comprising multiple data elements that are restricted to repeat as a group by the relationships of the target schema and to any number of source data elements that are restricted from repeating in the source XML document by the relationships of the source schema, and
    a third type restricting the function to a first number of instances of a group comprising multiple data elements that are restricted to repeat as a group by the relationships of the target schema, a second number of instances of a group comprising multiple data elements that are restricted to repeat as a group by the relationships of the source schema, and any number of source data elements that are restricted from repeating in the source XML document by the relationships of the source schema, the first and second numbers being equal.

8. The method of claim 7, wherein the step of queuing includes the steps of:

assigning a key to each new request; and storing a translated XML document in persistent memory.

9. The method of claim 7, wherein the instructions of each mapping rule include a computer program.

10. The method of claim 9, wherein the computer program includes a Java program.

11. The method of claim 10, wherein the computer program refers only methods of the Java String class.

12. The method of claim 7, further comprising the steps of:

waiting a set period of time to receive an ACK from the destination system;

retrying to send the translated XML document to the destination system a set number of times;

signaling an error if the ACK is not received; and upon receipt of the ACK, removing the translated XML document from the persistent memory.

* * * * *